Oct. 20, 1959
C. H. BENNETT
2,909,210
METHOD OF AND APPARATUS FOR INSTALLING AND
FLARING DIESEL ENGINE INJECTOR TUBES
Filed March 26, 1954
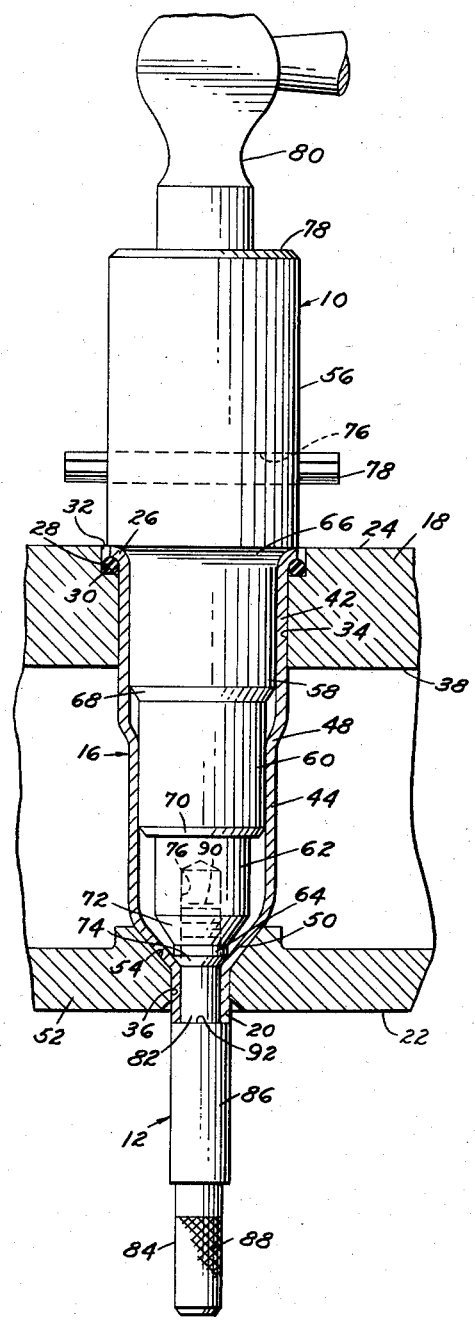
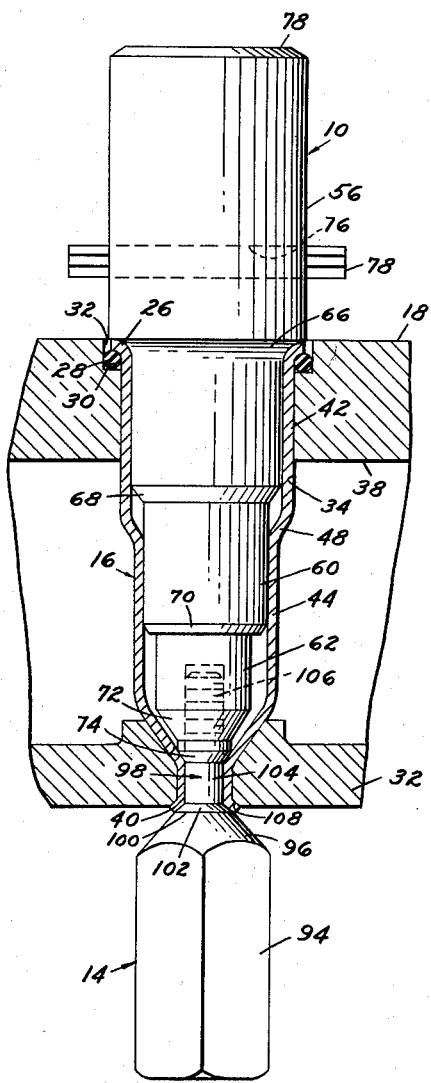
INVENTOR.
CLIFFORD H. BENNETT
BY
Burton & Parker
ATTORNEYS United States Patent Office 2,909,210
Patented Oct. 20, 1959

2,909,210

METHOD OF AND APPARATUS FOR INSTALLING AND FLARING DIESEL ENGINE INJECTOR TUBES

Clifford H. Bennett, Jackson, Mich., assignor to Kent-Moore Organization, Inc., Detroit, Mich., a corporation of Michigan Application March 26, 1954, Serial No. 419,057

3 Claims. (Cl. 153—79)

This invention relates to a process of and apparatus for installing and flaring a diesel engine injector tube in the cylinder head of an engine.

In many of the modern diesel engines of today, the fuel is injected into the combustion chamber by means of a fuel injector device which is mounted in the cylinder head of the engine. An injector nozzle, part of the injector device, opens into the combustion chamber through a port in the cylinder head. Because the injector frequently extends across or through a water cooling passageway in the cylinder head, it is necessary to seal the water in the passageway from contact with the injector and also prevent leakage of the water from the passageway down along the injector and into the combustion chamber of the engine. To prevent such leakage of water into the combustion chamber around the injector, where the injector enters the combustion chamber, and also to prevent direct contact of the water with the injector, the injector is encased in what may be termed an injector tube.

The tube is made of copper or some other malleable metal. It frequently becomes worn or damaged, or loosens up from its seat in the cylinder head, permitting water to leak into the combustion chamber of the engine. In this event the tube must be replaced. The tube is provided with a flange at its upper end, which flange seats against a sealing ring disposed on the outside surface of the cylinder head. The tube extends through the cylinder head, extending across the water or coolant passageway in the head, and the lower end, or tip of the tube, extends through the combustion chamber surface of the head. The tube tip is flared over against the combustion chamber surface of the head to seal the tube tip against the head and prevent the escape of coolant from the passageway into the combustion chamber of the engine.

The worn or damaged tube may be removed from the cylinder head after the manner, and with the apparatus, shown in my co-pending application, Serial No. 419,056, filed March 26, 1954. After removal of the worn tube, a new tube is installed in the cylinder head and the tube tip flared over against the combustion chamber surface of the head. That portion of the flared-over tip which extends below the combustion chamber surface of the head is reamed away in the manner, and with the spot-facing reamer, disclosed in my co-pending application, Serial No. 418,820, filed March 26, 1954.

The instant application is concerned with the initial installation of the new tube in the head and the flaring of the tube tip against the combustion chamber surface of the head.

An object of my invention is the provision of an injector tube installation tool adapted to support an injector tube for installation in a cylinder head, which tool is provided with tube-engaging surfaces adapted to abut the tube in a fashion such that by driving against the tool, the tube may be pressed into seating relationship with the walls or surfaces of a cylinder head opening, without danger of crushing or distorting the tube.

Another object of the invention is the provision of an installation tool over which the injector tube is telescoped, and the provision of a pilot element receivable through the injector tube tip and co-operable with the installation tool to hold the tube on the tool for installation in a cylinder head.

Another object of the invention is the provision of a pilot member or element of the aforesaid character, wherein the pilot is provided with a shoulder portion adapted to abut the tube tip and urge the tube against the installation tool, with the shoulder having a diameter equaling or exceeding the outside diameter of the tube tip, so that upon insertion of the tube within the head, the pilot will guide the tube tip into seating position within the head and will prevent the tube tip from striking the head and thereby bending or mutilating the tip during the installation of the tube in the head.

Another object of my invention is the provision of a tube tip flaring tool engageable and cooperable with the installation tool to flare over the tube tip against the cylinder head after the tube has been installed in the head by the installation tool.

Still another object of my invention is the provision of a process for installing an injector tube in a cylinder head, which includes the steps of telescoping an injector tube over an installation tool, inserting a pilot element through the tube tip and engaging the element with the installation tool with a portion of the element overlying the end of the tube tip, driving against the installation tool to force the injector tube into seating relationship within the cylinder head, removing the pilot element, inserting a flaring tool through the tube tip and urging the flaring tool against the tip to flare the tip against the cylinder head, and thereafter removing the flaring tool and the installation tool from the injector tube.

Other objects, advantages, and meritorious features will become more fully apparent from the following specification, claims, and drawings, wherein:

Fig. 1 is a cross-sectional view through a diesel engine cylinder head showing an injector tube telescoped over my improved installation tool, and showing the pilot element extending through the tube tip, with the installation tool and pilot element and the tube gripped therebetween, seated in the cylinder head; and Fig. 2 is similar to Fig. 1 except that the pilot element has been replaced by the flaring tool, and the tube tip has been flared against the cylinder head.

The tools herein disclosed belong to a set of injector tube service tools which are employed to remove worn injector tubes and replace them with new tubes. This application relates to three tools shown in the drawings as an installation tool member 10, a pilot element 12, and a flaring tool 14, which are used cooperatively to install a new injector tube 16 in the cylinder head 18, and flare over the tube tip 20 against the combustion chamber surface 22 of the head. The injector tube 16 is formed of a malleable metal such as copper, and extends through the cylinder head from the upper surface 24 of the head to and through the combustion chamber surface 22 thereof. A flared portion 26 of the tube is adapted to abut a sealing ring 28 encircling the tube, and compress the ring between the flared portion and the bottom 30 of a recess 32 formed in the upper surface of the head. The tube extends through an aperture 34 in the upper surface of the head, and through an aperture 36 in the lower surface of the head. The tube extends across a cylinder head coolant passageway 38. When the tube is installed and the tube tip flared over as at 40, in a manner hereinafter described, the sealing ring 28 and the flare 40 prevent the escape of coolant either upwardly or downwardly of the tube outwardly of the surfaces of the head.

The tube 16 tapers from the upper end to the tip through a plurality of decreasingly smaller diametered cylindrical steps indicated as 42, 44 and 46. Step 46 forms the injector tube tip. The steps 42 and 44 are joined by inwardly bent portion 48, and steps 44 and 46 are joined by a similar portion 50. The aperture 36 through the lower wall 52 of the head, is beveled as at 54 to serve as a seat for the inwardly bent portion 50 of the tube.

The apertures 34 and 36 in the cylinder head through which the tube extends are sized such that the tube is a press fit within the head. Because the tube is malleable, it cannot be inserted and seated in the head easily by any of the conventional ways of inserting and driving a tube into place. When conventional methods are employed, the tube tip is likely to jam against the bevel 54 and be deformed during the driving of the tube into place. Also, the walls of the tube are relatively thin and will not withstand any great amount of driving force, and are apt to buckle inwardly or outwardly within the coolant passageway. They are also likely to buckle inwardly where they pass through the apertures 34 and 36 in the head.

Therefore, to enable rapid and satisfactory installation of the tube, I have provided the novel installation tool 10. The tool is tapered from the upper end to the lower end through a succession of annular shoulders 56, 58, 60, 62 and 64. The shoulders 56 and 58 meet at an inwardly turned surface 66, and the remaining shoulders meet at beveled portions 68, 70 and 72. The shoulder 64 terminates at its lower edge in a taper 74 which forms the lower end face of the tool.

The tool is concentrically bored and tapped as at 76, with the bore opening outwardly through the tapered end face 74. The bore adjacent the end face 74 is enlarged somewhat beyond the diameter of the bore inwardly of the end face. This is for the purpose of easily starting the threaded ends of the pilot element and the flaring tool in the threads of the bore. It is also provided to permit all the threads of the stem of the flaring tool to be inserted into the enlarged bore of the installation tool, so that only the smooth portion of the stem of the flaring tool is within the wall of the tube tip when the flaring operation is commenced.

As is noted from considering the drawings, when the installation tool member 10 is telescoped within the injector tube, shoulders 58 and 60 bear against the steps 42 and 44 respectively, and the beveled end face 74 bears against the inwardly bent portion 50 of the tube tip. The inwardly turned portion 66 of the tool is adapted to abut the flare 26. Those portions of the tool which bear against the tube in a manner to urge it into the cylinder head, are the surfaces 66 and 74. These surfaces abut the tube substantially at its opposite ends. A substantial portion of the inwardly bent surface 50 of the tube is left without any internal support by the tool so that such portion of the tube is free to bend inwardly as it will in order to conform precisely with the bevel 54 when the tube is seated in the head.

The upper end of the installation tool is diametrically bored as at 76 to receive a pin 78. The pin is adapted to be used as a means of urging the tool out of the tube after the tube has been installed in the cylinder head. The pin also provides a means for holding the installation tool against rotation during the tube tip flaring operation. The upper end face 78 of the tool serves as a striking face for a hammer 80 or the like.

Cooperable with the installation tool 10 is the pilot element 12. The pilot is provided with reduced diameter opposite end portions 82 and 84 and an intermediate portion 86. The end 84 of the pilot is knurled as at 88 to form a surface readily gripped by a mechanic. The end 82 of the pilot is adapted to be received through the injector tube tip, with the threaded portion 90 of the end 82 of the element engaged with the threads of the bore 76 in the installation tool. That portion of end 82 between the threads and the edge 92 of the intermediate portion 86, is smooth and of such diameter as to be received within the tube tip in abutment with the internal surface of the wall of the tube tip. Upon threading the pilot into the male installation member 10, the edge 92 of the pilot cooperates with the beveled end face 74 of the installation tool, to grip the tube tip therebetween and hold the tube on the installation tool. The greatest diameter of the pilot element is slightly less than the diameter of the aperture 36 through the combustion chamber surface of the cylinder head.

To install the injector tube 16, the tube is telescoped over the installation tool and the pilot element is inserted through the tube tip and threaded against the end of the tip to grip the tip between the end of the installation tool and the shoulder 86 of the pilot. The installation tool and pilot, with the tube mounted thereon as shown in Fig. 1, is then inserted in the aperture 34 in the head, and the pilot extended down through the aperture 36 so that the cylindrical surface of shoulder 86 extends through the aperture 36. Then, by driving against the upper face 78 of the installation tool with the hammer 80, the entire assembly is forced to the position shown in Fig. 1. The pilot element guides the tube tip into the aperture 36 and aligns the tube with the apertures 34 and 36 in the head. The installation tool serves to urge the tube uniformly into the cylinder head and prevent buckling or collapse of the walls of the tube during the installation. Thereafter the pilot is unthreaded from the installation tool.

The tube tip is flared over against a beveled portion of the combustion chamber surface 22 of the cylinder head with the flaring tool 14 shown in Fig. 2. This tool is shaped to exhibit a wrench-engaging portion 94 terminating at one end in a conical surface 96 which extends toward the stem 98. The conical surface 96 is interrupted as at 100 by a more sharply angling conical surface 102, which terminates at the stem 98. Adjacent the surface 102 the stem exhibits a smooth surface 104, but throughout the remainder of the stem it is threaded as at 106 to be threadedly coupled with the bore 76 of the installation tool.

The conical surface 102 of the flaring tool is adapted to abut the tube tip 20 and flare it outwardly and against the beveled surface 108 of the wall of the aperture 36.

To complete the installation and flaring of the injector tube, after the pilot element is removed as aforesaid, the flaring tool stem 98 is inserted through the tube tip and threaded into the bore 76 of the installation tool. By continued threading of the stem of the flaring tool into the bore, the conical surface 102 is brought into abutment with the tube tip 20, and forces the tube outwardly and against the beveled surface 108 of the head. During such threading of the flaring tool into the installation tool, the flaring tool urges the installation tool downwardly to squeeze the tube between the beveled surface 74 of the tool and the beveled surface 54 of the head. Therefore, when the tube tip is flared as at 40, a tight seal between the tube and the cylinder head is assured at that point where the tube extends through the lower wall 52 of the head.

The flaring tool is then unthreaded from the installation tool and removed from the tube tip. By prying against the pin 78, if necessary, the installation tool may then also be removed from the injector tube; and the installation of the tube and flaring of the end is thereby completed.

What I claim is:

1. Injector tube installation apparatus comprising: an installation tool having a cylindrical portion tapering to one end and exhibiting at such end an annular beveled surface adapted to abut the interior of an injector tube adjacent the tube tip, said tool provided with an annular shoulder spaced from said end and adapted to abut the end of the injector tube opposite the tip when the installation tool is inserted in the tube; a pilot element receivable through the injector tube tip to be threadedly coupled with the installation tool at said one end, the pilot element being provided with an annular shoulder having a greater diameter than that portion of the pilot extending through the tube tip, said shoulder adapted to overlie the exterior end of the tube tip and cooperate with the beveled surface of the installation tool to grip the tube tip therebetween.

2. Injector tube installation apparatus comprising: an installation tool having a cylindrical portion tapering to one end and exhibiting at such end an annular beveled surface adapted to abut the interior of an injector tube adjacent the tube tip, said tool provided with an annular shoulder spaced from said end and adapted to abut the end of the injector tube opposite the tip when the installation tool is inserted in the tube, a pilot element having a reduced diameter portion at one end terminating remote from such end in an annular shoulder with the reduced diameter portion adapted to be received through an injector tube tip to be threadedly coupled with said one end of the installation tool with the shoulder of the pilot overlying the exterior end of the tube tip, said shoulder adapted to cooperate with the beveled surface of the installation tool to grip the tube tip therebetween.

3. Injector tube installation apparatus comprising: an installation tool having a cylindrical portion tapering to one end of the tool through a plurality of successive shoulders with some of the shoulders adapted to abut the interior of an injector tube when the tool is inserted in the injector tube, and a flaring tool exhibiting at one end an axially extending stem portion threaded at the free end to be coupled with said one end of the installation tool, that end face of the flaring tool adjacent the stem being shaped to exhibit a conical flaring surface, and that portion of the stem intermediate the conical end face of the flaring tool and the threaded end of the stem being a smooth cylindrical surface adapted to abut the wall of an injector tube tip when the flaring tool stem is coupled with the installation tool.

References Cited in the file of this patent

UNITED STATES PATENTS

| | | |
|---|---|---|
| D. 129,149 | Jones | Aug. 26, 1941 |
| 784,192 | Throop | Mar. 7, 1905 |
| 1,566,645 | Breeze | Dec. 22, 1925 |
| 1,614,159 | Smith | Jan. 11, 1927 |
| 1,707,124 | Lacerda | Mar. 26, 1929 |
| 2,336,541 | Gunter | Dec. 14, 1943 |
| 2,400,686 | Cox | May 21, 1946 |
| 2,680,903 | Potter | June 15, 1954 |

FOREIGN PATENTS

| | | |
|---|---|---|
| 501,347 | Great Britain | Feb. 27, 1939 |